US012649361B2

(12) United States Patent
Byun et al.

(10) Patent No.: US 12,649,361 B2
(45) Date of Patent: Jun. 9, 2026

(54) ACTIVE AIR FLAP DEVICE FOR VEHICLE

(71) Applicant: HYUNDAI MOBIS CO., LTD., Seoul (KR)

(72) Inventors: Jae Sup Byun, Yongin-si (KR); Jang Ho Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 322 days.

(21) Appl. No.: 18/521,171

(22) Filed: Nov. 28, 2023

(65) Prior Publication Data

US 2024/0391311 A1 Nov. 28, 2024

(30) Foreign Application Priority Data

May 23, 2023 (KR) ........................ 10-2023-0066297

(51) Int. Cl.
*B60K 11/08* (2006.01)
(52) U.S. Cl.
CPC ................................. *B60K 11/085* (2013.01)
(58) Field of Classification Search
CPC ......... B60K 11/085; B60K 11/08; F01P 11/10
See application file for complete search history.

(56) References Cited

FOREIGN PATENT DOCUMENTS

DE 102021127798 A1 * 5/2022 ............. B60K 11/08

OTHER PUBLICATIONS

Translation of Metzler (DE-102021127798-A1) relied upon by the non-final rejection. (Year: 2022).*

* cited by examiner

*Primary Examiner* — James A Shriver, II
*Assistant Examiner* — Nicholas R. Kandas
(74) *Attorney, Agent, or Firm* — NSIP Law

(57) ABSTRACT

An active air flap device for vehicle including a frame part including a first frame forming a first path and a second frame spaced apart from the first frame and forming a second path, a flap part including a first flap rotatably supported by the first frame to selectively open or close the first path and a second flap rotatably supported by the second frame and configured to selectively open or close the second path, a driving part installed on any one of the first frame and the second frame to generate a driving force to rotate the first flap and the second flap, and a link part to transmit the driving force of the driving part to the flap part to rotate the first flap and the second flap.

10 Claims, 7 Drawing Sheets

1

100:110, 120
200:210, 220
400:410, 420, 430

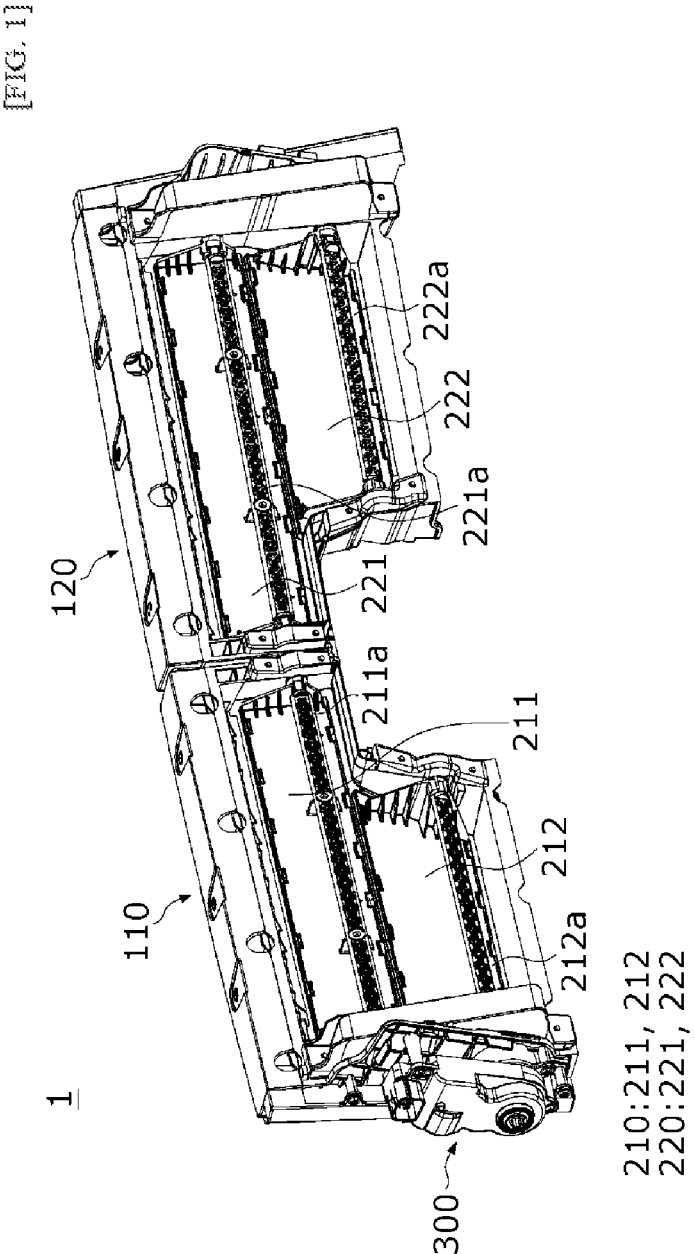
[FIG. 1]
1
120
110
222a
222
221a
221
211a
211
212
212a
300
210:211, 212
220:221, 222

[FIG. 2]
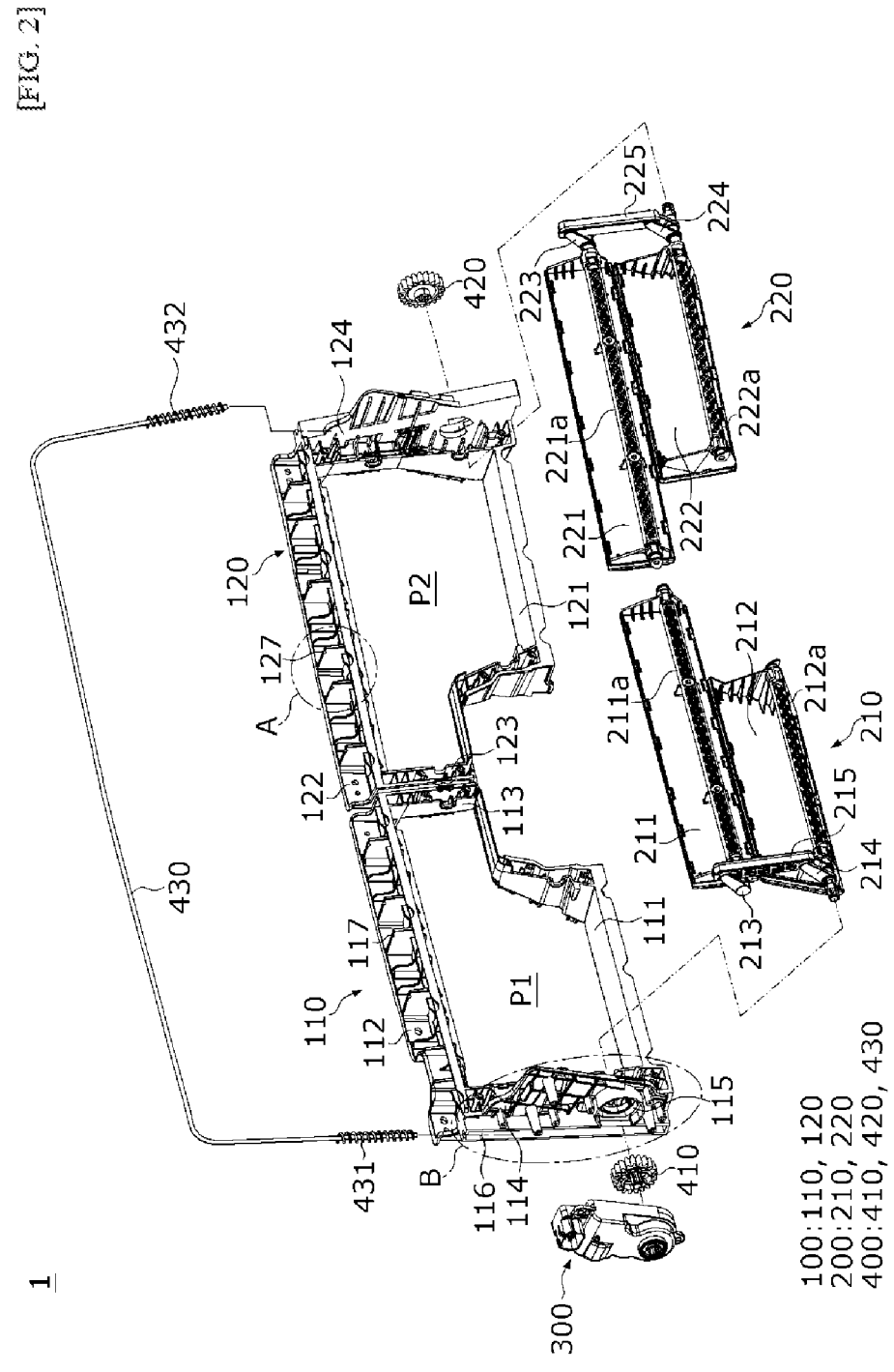
100:110, 120
200:210, 220
400:410, 420, 430

[FIG. 3A]
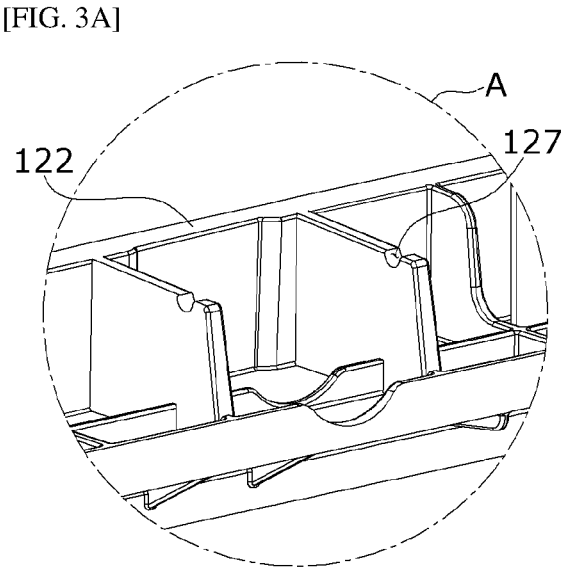
[FIG. 3B]
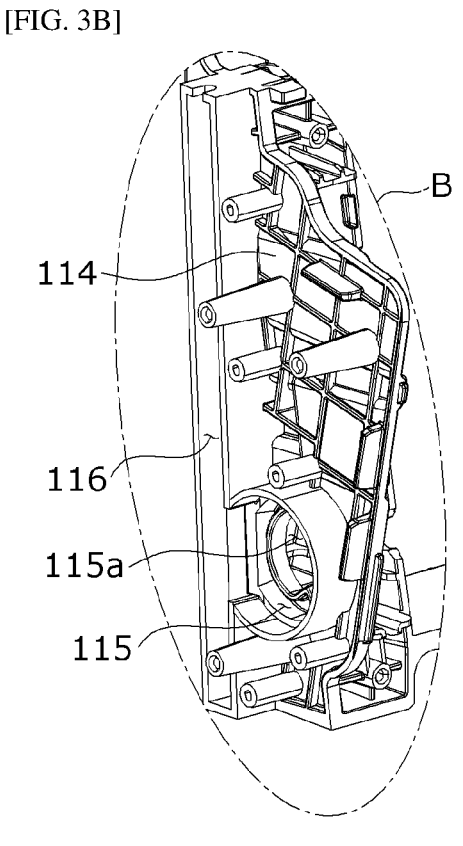

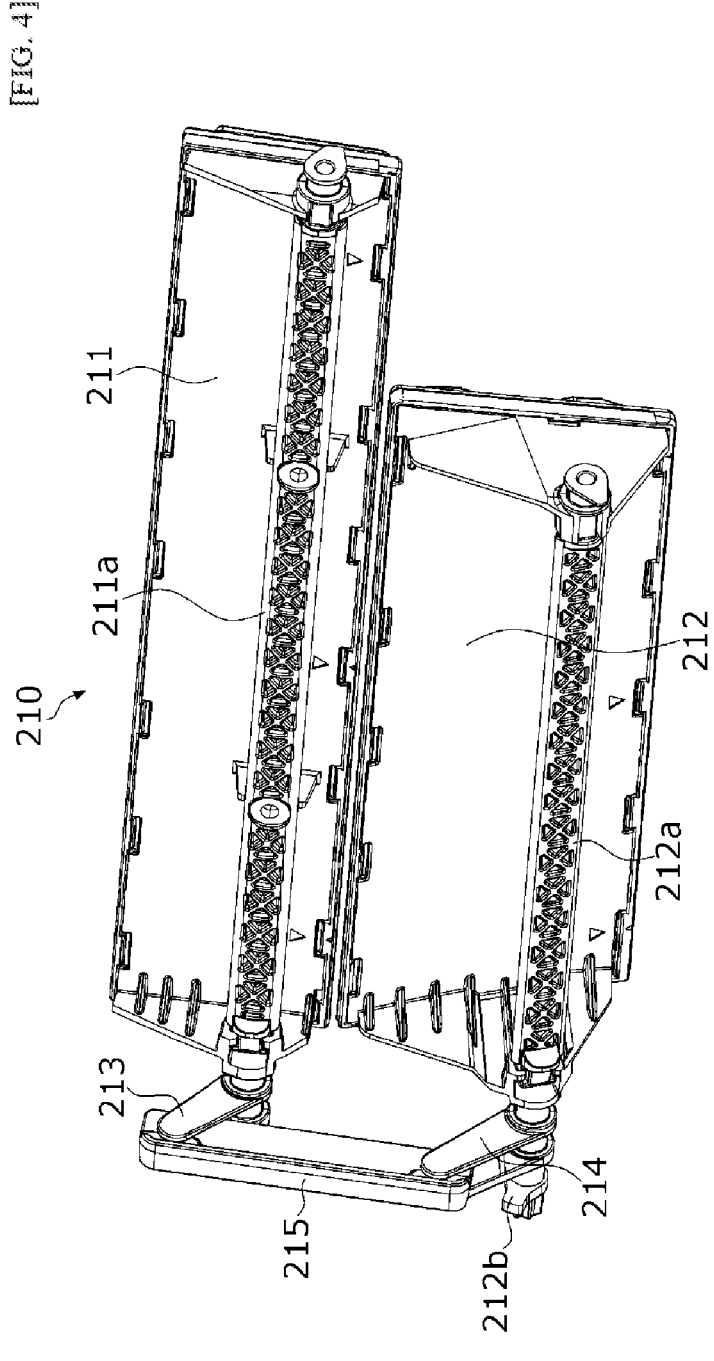
[FIG. 4]

[FIG. 5]
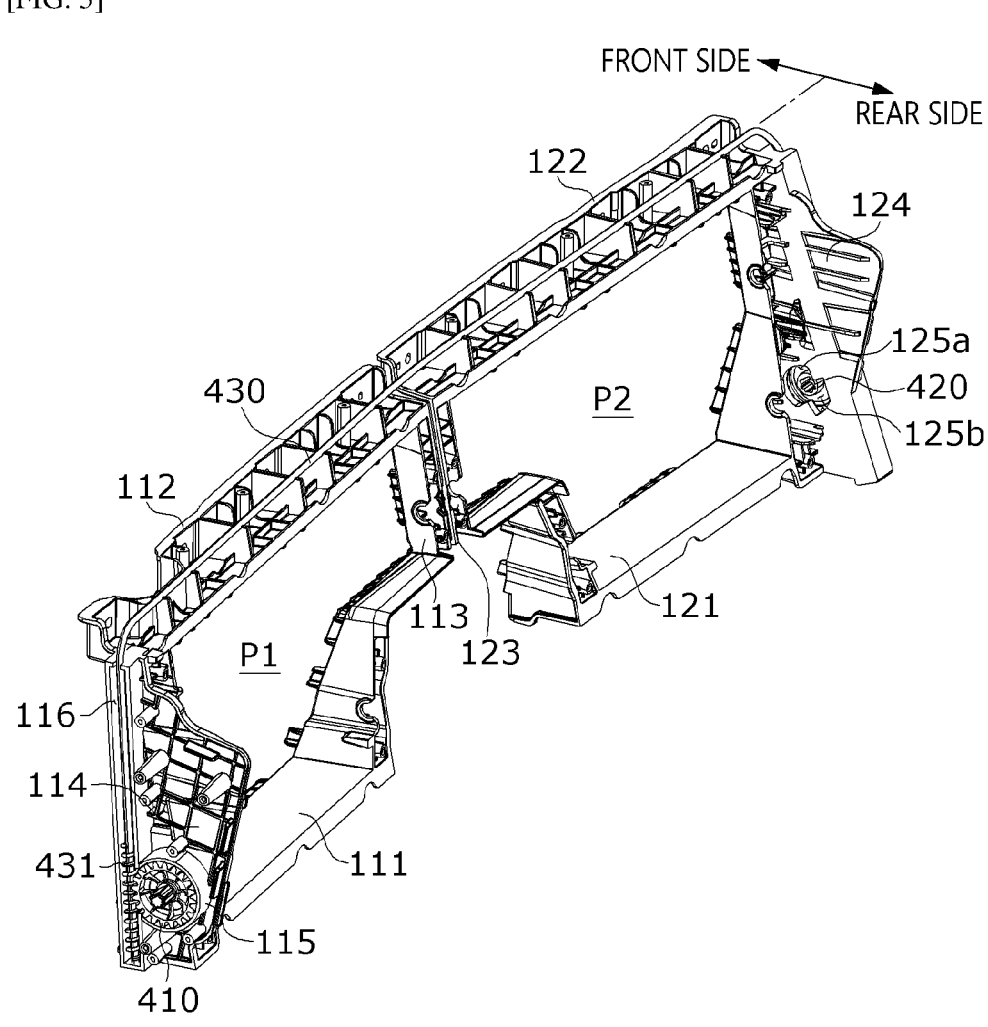

[FIG. 6]
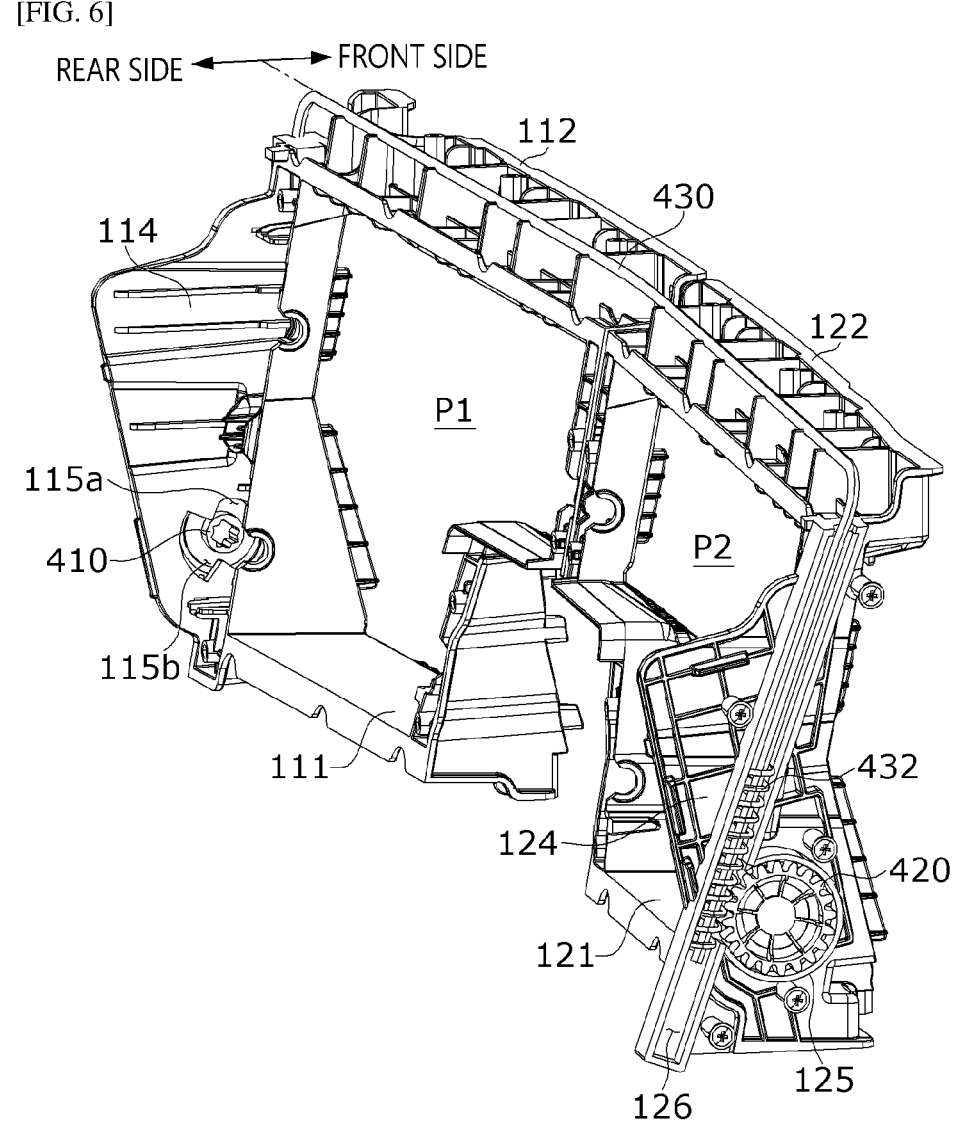

[FIG. 7]
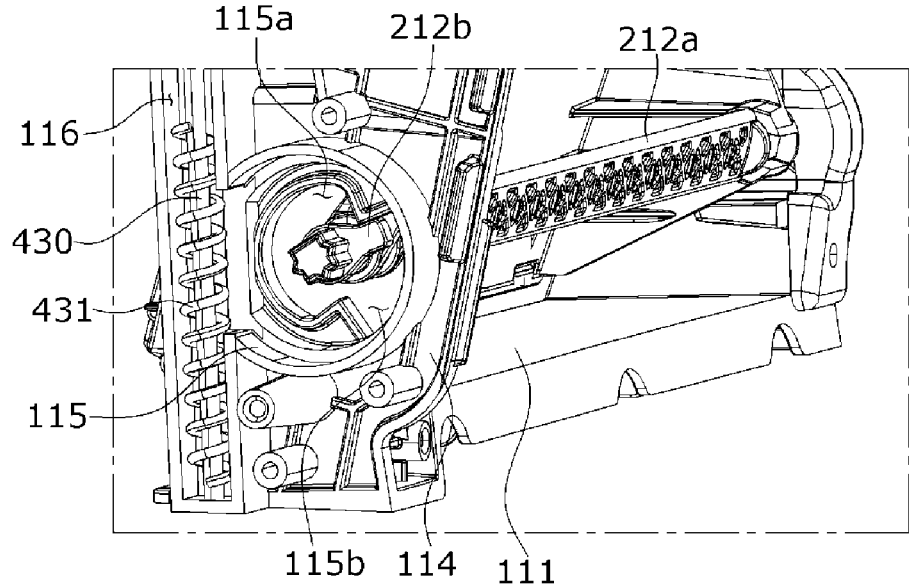
[FIG. 8]
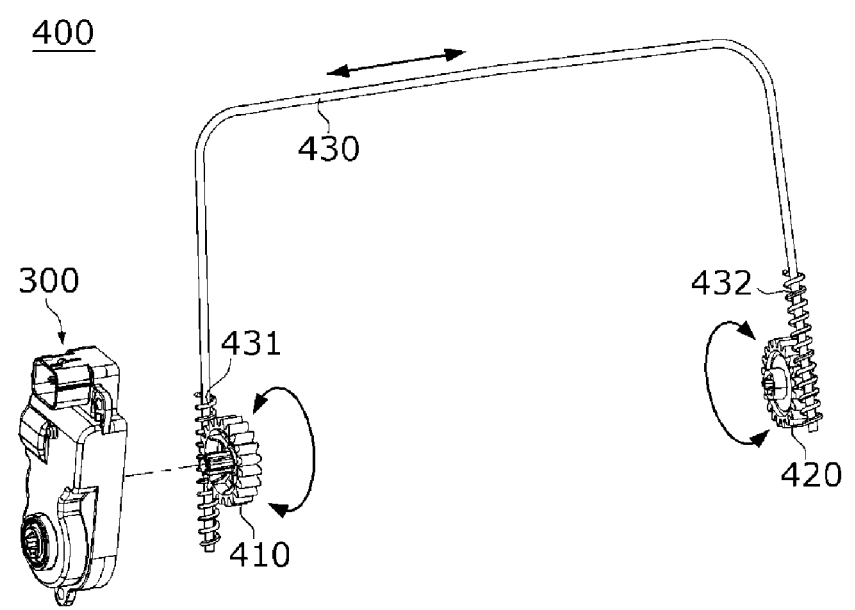

ACTIVE AIR FLAP DEVICE FOR VEHICLE

CROSS-REFERENCE TO RELATED APPLICATION

This application claims priority to and the benefit of Korean Patent Application No. 10-2023-0066297, filed on May 23, 2023, in the Korean Intellectual Property Office, the disclosure of which is incorporated herein by reference in its entirety for all purposes.

BACKGROUND

1. Field of the Invention

The present invention relates to a vehicle active air flap device.

2. Discussion of Related Art

An active air flap (AAF) device is installed inside a grill (or attached to a grill) at the front of a vehicle and opens or closes an outside air inlet of the grill according to a state of the vehicle.

Specifically, an AAF closes a flap to close the outside air inlet to obtain effects of reducing air resistance and improving fuel efficiency when the vehicle is driven at high speed and opens the flap to open the outside air inlet to lower a temperature in an overheated engine room when the vehicle is driven at low speed.

Such AAF devices are each applied at both left and right sides in a width direction of the vehicle to drive left and right flaps, and thus an actuator is individually provided to each AAF at both the left and right sides.

In the case of the AAF device, since a proportion of a cost of the actuator is largest, cost reduction is required, and when one actuator does not operate properly, there is a problem that only one flap operates.

Accordingly, there is a need to solve the problems.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to providing an active air flap device for vehicle which operates both left and right flaps at the same time using one driving part.

Objectives to be solved through the present invention are not limited to the above-described objectives, and other objectives which are not described above will be clearly understood to those skilled in the art from the following description.

In one general aspect, an active air flap device for vehicle includes a frame part including a first frame forming a first path and a second frame spaced apart from the first frame and forming a second path; a flap part including a first flap rotatably supported by the first frame and configured to selectively open or close the first path and a second flap rotatably supported by the second frame and configured to selectively open or close the second path; a driving part installed on any one of the first frame and the second frame and configured to generate a driving force to rotate the first flap and the second flap; and a link part configured to transmit the driving force of the driving part to the flap part to rotate the first flap and the second flap.

The link part may include a first rack gear connected to a rotary shaft of the first flap on the first frame, a second rack gear connected to a rotary shaft of the second flap on the second frame, and a connecting cable connecting the first rack gear to the second rack gear, wherein the connecting cable may include pinion gears gear-connected to the first rack gear and the second rack gear on both end regions in contact with the first rack gear and the second rack gear.

In the link part, the first rack gear may be connected to the driving part and rotated, the pinion gear on one side of the connecting cable may be engaged with the first rack gear, and as the first rack gear rotates, the connecting cable may rotate the second rack gear engaged with the pinion gear on the other side thereof while moving toward the first rack gear or the second rack gear.

The first rack gear may be disposed on an outer side frame of the first frame, the second rack gear may be disposed on an outer side frame of the second frame, the connecting cable may extend along each of upper frames of the first frame and the second frame, and the pinion gears may be disposed on the outer side frame of the first frame and the outer side frame of the second frame.

The first frame may include a first mounting groove in which the first rack gear is mounted and a first accommodation groove which accommodates the pinion gear of the connecting cable in the outer side frame, the second frame may include a second mounting groove in which the second rack gear is mounted and a second accommodation groove which accommodates the pinion gear of the connecting cable in the outer side frame, and positions at which the first mounting groove and the first accommodation groove are disposed in the outer side frame of the first frame may be different from positions at which the second mounting groove and the second accommodation groove are disposed in the outer side frame of the second frame.

Seating grooves in which the connecting cable is seated and supported may be disposed in the upper frames of the first frame and the second frame, and the connecting cable may be configured to move horizontally in a left-right direction while seated in the seating grooves.

A through hole through which the rotary shaft of the first flap passes may be disposed in the first mounting groove, and the through hole may include a limiting hole which accommodates a stopper disposed on the rotary shaft and configured to limit a rotation range of the rotary shaft.

A rotation direction of the first rack gear and a rotation direction of the second rack gear may be the same.

The first flap may include a first upper flap and a first lower flap which are disposed vertically, and in a state in which a first upper extension link extending from a rotary shaft of the first upper flap and a first lower extension link extending from a rotary shaft of the first lower flap are connected to a first end and a second end of the first connecting link, respectively, as the rotary shaft of the first lower flap is rotated by the driving force, the rotary shaft of the first upper flap connected to the first connecting link may be rotated.

The second flap may include a second upper flap and a second lower flap which are disposed vertically, and in a state in which a second upper extension link extending from a rotary shaft of the second upper flap and a second lower extension link extending from a rotary shaft of the second lower flap are connected to a first end and a second end of the second connecting link, respectively, as the rotary shaft of the second lower flap is rotated by the driving force transmitted through the link part, the rotary shaft of the second upper flap connected to the second connecting link may also be rotated.

Other features and aspects will be apparent from the following detailed description, the drawings, and the claims.

BRIEF DESCRIPTION OF THE DRAWINGS

FIG. 1 is a schematic view illustrating an active air flap device according to an embodiment of the present invention;

FIG. 2 is a schematic view illustrating a structure of the active air flap device;

FIGS. 3A and 3B are views illustrating portion "A" and portion "B" in FIG. 2;

FIG. 4 is a schematic view illustrating a first flap in the active air flap device;

FIG. 5 is a schematic view illustrating a frame part and a link part in the active air flap device;

FIG. 6 is another schematic view illustrating the frame part and the link part in the active air flap device;

FIG. 7 is a schematic view illustrating a first mounting groove and a first accommodation groove provided in an outer side frame of a first frame; and FIG. 8 is a view for describing an operation of the link part in the active air flap device.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims.

Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, but the same or corresponding components are assigned the same reference numbers even in different drawings and are not redundantly described herein.

FIG. 1 is a schematic view illustrating an active air flap device according to an embodiment of the present invention, and FIG. 2 is a schematic view illustrating a structure of the active air flap device. FIGS. 3A and 3B are views illustrating portion "A" and portion "B" in FIG. 2, and FIG. 4 is a schematic view illustrating a first flap in the active air flap device. FIG. 5 is a schematic view illustrating a frame part and a link part in the active air flap device, and FIG. 6 is another schematic view illustrating the frame part and the link part in the active air flap device. FIG. 7 is a schematic view illustrating a first mounting groove and a first accommodation groove provided in an outer side frame of a first frame, and FIG. 8 is a view for describing an operation of the link part in the active air flap device.

Referring to the drawings, an active air flap device 1 according to the embodiment of the present invention may include a frame part 100, a flap part 200, a driving part 300, and a link part 400.

The frame part 100 may include a first frame 110 forming a first path P1 and a second frame 120 forming a second path P2, and the first frame 110 and the second frame 120 may be disposed to be spaced by a predetermined gap.

Each of the first frame 110 and the second frame 120 may have a substantially quadrangular frame shape and may be installed on a grill in front of an engine room of a vehicle.

The first frame 110 and the second frame 120 may have hollow structures in which the lower frames 111 and 121 and upper frames 112 and 122 are connected through inner side frames 113 and 123 and outer side frames 114 and 124, respectively. In addition, the inner side frames 113 and 123 may be disposed to be spaced apart from each other in a width direction of the vehicle.

The flap part 200 may include a first flap 210 disposed in the first frame 110 and a second flap 220 disposed in the second frame 120.

The first flap 210 may be rotatably supported by the first frame 110 to selectively open or close the first path P1, and the second flap 220 may be rotatably supported by the second frame 120 to open or close the second path P2.

As illustrated in the drawings, the first flap 210 may include a first upper flap 211 and a first lower flap 212 which are disposed vertically.

Rotary shafts 211*a* and 212*a* of the first upper flap 211 and the first lower flap 212 may each be rotatably supported by the first frame 110.

The first upper flap 211 may include a first upper extension link 213 extending from the rotary shaft 211*a*, and the first lower flap 212 may include a first lower extension link 214 extending from the rotary shaft 212*a*. The first upper extension link 213 and the first lower extension link 214 may be provided with structures which protrude from one end regions of the rotary shafts 211*a* and 212*a* in directions perpendicular to extending directions of the rotary shafts 211*a* and 212*a*.

In addition, the first upper extension link 213 extending from the rotary shaft 211*a* of the first upper flap 211 and the first lower extension link 214 extending from the rotary shaft 212*a* of the first lower flap 212 may be rotatably connected to one end and the other end of a connecting link 215, respectively.

Accordingly, the first upper flap 211 and the first lower flap 212 are connected through the first connecting link 215 so that, when the first lower flap 212 rotates, the first upper flap 211 also rotates together. That is, as the rotary shaft 212*a* of the first lower flap 212 rotates, the rotary shaft 211*a* of the first upper flap 211 connected to the first connecting link 215 also rotates.

The second flap 220 may include a second upper flap 221 and a second lower flap 222 which are disposed vertically.

Rotary shaft 221*a* of the second upper flap 221 and rotary shaft 222*a* of the second lower flap 222 may each be rotatably supported by the second frame 120.

The second upper flap 221 may include a second upper extension link 223 extending from the rotary shaft 221*a*, and the second lower flap 222 may include a second lower extension link 224 extending from the rotary shaft 222*a*. The second upper extension link 223 and the second lower extension link 224 may be provided with structures which protrude from one end regions of the rotary shafts 221*a* and 222*a* in directions perpendicular to extending directions of the rotary shafts 221*a* and 222*a*, respectively.

In addition, the second upper extension link 223 extending from the rotary shaft 221*a* of the second upper flap 221 and the second lower extension link 224 extending from the rotary shaft 222*a* of the second lower flap 222 may be rotatably connected to one end and the other end of the connecting link 225, respectively.

Accordingly, the second upper flap 221 and the second lower flap 222 are connected through a second connecting link 225 so that, when the second lower flap 222 rotates, the second upper flap 221 also rotates together. That is, as the rotary shaft 222*a* of the second lower flap 222 rotates, the rotary shaft 221*a* of the second upper flap 221 connected to the second connecting link 225 also rotates.

In the present embodiment, it is illustrated that the first flap 210 includes two parts including the first upper flap 211 and the first lower flap 212 and the second flap 220 also includes two parts including the second upper flap 221 and the second lower flap 222, but the present invention is not limited thereto. For example, each of the first flap 210 and the second flap 220 may be provided to include a single part or also include two or more parts.

The driving part 300 may be provided as a single part and installed on any one of the first frame 110 and the second frame 120. In the embodiment, the driving part 300 may be installed on an outer side frame 114 of the first frame 110. In addition, the driving part 300 may be connected to the rotary shaft 212*a* of the first lower flap 212.

In the present embodiment, it is described that the driving part 300 is installed on the first frame 110 and connected to the first flap 210, but the present invention is not limited thereto.

The driving part 300 may generate a driving force for rotating the first flap 210 and the second flap 220. In the embodiment, the driving part 300 may include an actuator.

The link part 400 transmits the driving force of the driving part 300 to the flap part 200 to rotate the first flap 210 and the second flap 220.

Referring to the drawings, the link part 400 may include a first rack gear 410, a second rack gear 420, and a connecting cable 430.

The first rack gear 410 may be connected to the rotary shaft 212*a* of the first flap 210 on the first frame 110, and the second rack gear 420 may be connected to the rotary shaft 222*a* of the second flap 220 on the second frame 120. In the embodiment, the first rack gear 410 may be connected to the rotary shaft 212*a* of the first lower flap 212, and the second rack gear 420 may be connected to the rotary shaft 222*a* of the second lower flap 222.

In addition, the connecting cable 430 may connect the first rack gear 410 and the second rack gear 420. Specifically, the connecting cable 430 may include pinion gears 431 and 432 gear-connected to the first rack gear 410 and the second rack gear 420 in two end regions in contact with the first rack gear 410 and the second rack gear 420, respectively.

In the link part 400, the first rack gear 410 is connected to the driving part 300 and rotated, the pinion gear 431 on one side of the connecting cable 430 is engaged with the first rack gear 410, and as the first rack gear 410 rotates, the connecting cable 430 rotates the second rack gear 420 engaged with the pinion gear 432 on the other side thereof while moving toward the first rack gear 410 or the second rack gear 420.

Specifically, the first rack gear 410 may be disposed on the outer side frame 114 of the first frame 110, the second rack gear 420 may be disposed on an outer side frame 124 of the second frame 120, the connecting cable 430 may extend along the upper frames 112 and 122 of the first frame 110 and the second frame 120 in a state in which the pinion gear 431 on one side is disposed on the outer side frame 114 of the first frame 110 such that the pinion gear 432 on the other side may be disposed on the outer side frame 124 of the second frame 120. In addition, the pinion gear 431 on one side of the connecting cable 430 on the outer side frame 114 of the first frame 110 may be gear-connected to the first rack gear 410, and the pinion gear 432 on the other side of the connecting cable 430 on the outer side frame 124 of the second frame 120 may be gear-connected to the second rack gear 420.

Accordingly, when the first rack gear 410 connected to the driving part 300 is rotated by the driving force, the rotary shaft 212a of the first lower flap 212 connected to the first rack gear 410 is rotated, and the rotary shaft 211a of the first upper flap 211 connected to the first connecting link 215 is also rotated.

In addition, the connecting cable 430 connected to the first rack gear 410 transmits the driving force to the second rack gear 420 while moving to be pulled toward the first rack gear 410 or pushed toward the second rack gear 420 according to a rotation direction of the first rack gear 410.

In addition, when the second rack gear 420 is rotated due to the movement of the connecting cable 430, the rotary shaft 222a of the second lower flap 222 connected to the second rack gear 420 is rotated, and the rotary shaft 221a of the second upper flap 221 connected to the second connecting link 225 is also rotated.

Accordingly, the first flap 210, which directly receives the driving force of the driving part 300, and the second flap 220 which indirectly receives the driving force through the link part 400 may open or close the first path P1 and the second path P2 at the same time using the driving force generated by one driving part 300.

The link part 400 may be disposed and supported along a perimeter of the frame part 100.

Specifically, the first frame 110 may include a first mounting groove 115 in which the first rack gear 410 is mounted and a first accommodation groove 116 which accommodates the pinion gears 431 and 432 of the connecting cable 430 in the outer side frame 114. In addition, the second frame 120 may include a second mounting groove 125 in which the second rack gear 420 is mounted and a second accommodation groove 126 which accommodates the pinion gear 432 of the connecting cable 430 in the outer side frame 124.

In this case, positions at which the first mounting groove 115 and the first accommodation groove 116 are disposed in the outer side frame 114 of the first frame 110 may be designed to be different from positions at which the second mounting groove 125 and the second accommodation groove 126 are disposed in the outer side frame 124 of the second frame 120.

In the embodiment, in the outer side frame 114 of the first frame 110, the first accommodation groove 116 may be positioned forward further than the first mounting groove 115 in the vehicle, and in the outer side frame 124 of the second frame 120, the second mounting groove 125 may be positioned forward further than the second accommodation groove 126 in the vehicle. This layout design is to allow the rotation direction of the first rack gear 410 to be the same as a rotation direction of the second rack gear 420. Accordingly, the first flap 210 and the second flap 220 can rotate in the same direction to open or close the first path P1 and the second path P2 at the same time.

The first accommodation groove 116 and the second accommodation groove 126 may be provided with structures vertically extending from the outer side frame 114 of the first frame 110 and the outer side frame 124 of the second frame 120, respectively.

In addition, the first frame 110 and the second frame 120 may include seating grooves 117 and 127, in which the connecting cable 430 is seated to be supported, in the upper frames 112 and 122, respectively. Accordingly, the connecting cable 430 is supported to be move horizontally in a left-right direction while seated in the seating grooves 117 and 127 in the upper frames 112 and 122 of the first frame 110 and the second frame 120, respectively.

Meanwhile, a through hole 115a through which the rotary shaft 212a of the first flap 210 passes may be formed in the first mounting groove 115. The through hole 115a may include a limiting hole 115b which accommodates a stopper 212b provided on the rotary shaft 212a and limits a rotation range of the rotary shaft 212a.

In the embodiment, the stopper 212b may be provided with a protruding structure having a shape orthogonal to the rotary shaft 212a of the first lower flap 212. In addition, the stopper 212b may be accommodated in the limiting hole 115b and controlled to rotate within the rotation range provided by the limiting hole 115b from one end of the limiting hole 115b to the other end thereof (see FIG. 7).

A through hole 125a through which the rotary shaft 222a of the second flap 220 passes may also be formed in the second mounting groove 125. In addition, the through hole 125a of the second mounting groove 125 may also include a limiting hole 125b which accommodates a stopper (not shown) provided on the rotary shaft 222a of the second lower flap 222.

As described above, according to the present embodiment, since the first flap 210 and the second flap 220 which open or close the first path P1 and the second path P2 disposed in the width direction of the vehicle, respectively, are formed to be operated by the single driving part 300, there is an effect of reducing a product cost.

In addition, since the driving part 300 decreases, the layout design of the product can be easily changed.

According to an embodiment of the present invention, a vehicle active air flap device which operates both left and right flaps at the same time using one driving part to reduce a product cost can be provided.

Effects of the present invention are not limited to the above-described effects, and other effects which are not describe will be clearly understood by those skilled in the art from the description of the claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An active air flap device for vehicle comprising:
    a frame part including a first frame forming a first path and a second frame spaced apart from the first frame and forming a second path;
    a flap part including a first flap rotatably supported by the first frame and configured to selectively open or close the first path and a second flap rotatably supported by the second frame and configured to selectively open or close the second path;

a driving part installed on any one of the first frame and the second frame and configured to generate a driving force to rotate the first flap and the second flap; and a link part configured to transmit the driving force of the driving part to the flap part to rotate the first flap and the second flap, wherein the link part includes a first rack gear rotatably supported by the first frame and a second rack gear rotatably supported by the second frame.

2. The active air flap device of claim 1, wherein the link part includes:

the first rack gear connected to a rotary shaft of the first flap on the first frame;

the second rack gear connected to a rotary shaft of the second flap on the second frame; and a connecting cable connecting the first rack gear to the second rack gear, wherein the connecting cable includes pinion gears gear-connected to the first rack gear and the second rack gear on both end regions in contact with the first rack gear and the second rack gear.

3. The active air flap device of claim 2, wherein, in the link part, the first rack gear is connected to the driving part and rotated, the pinion gear on one side of the connecting cable is engaged with the first rack gear, and as the first rack gear rotates, the connecting cable rotates the second rack gear engaged with the pinion gear on the other side thereof while moving toward the first rack gear or the second rack gear.

4. The active air flap device of claim 2, wherein the first rack gear is disposed on an outer side frame of the first frame, the second rack gear is disposed on an outer side frame of the second frame, the connecting cable extends along each of upper frames of the first frame and the second frame, and the pinion gears are disposed on the outer side frame of the first frame and the outer side frame of the second frame, respectively.

5. The active air flap device of claim 4, wherein the first frame includes a first mounting groove in which the first rack gear is mounted and a first accommodation groove which accommodates the pinion gear of the connecting cable in the outer side frame, the second frame includes a second mounting groove in which the second rack gear is mounted and a second accommodation groove which accommodates the pinion gear of the connecting cable in the outer side frame, and positions at which the first mounting groove and the first accommodation groove are disposed in the outer side frame of the first frame are different from positions at which the second mounting groove and the second accommodation groove are disposed in the outer side frame of the second frame.

6. The active air flap device of claim 4, wherein seating grooves in which the connecting cable is seated and supported are disposed in the upper frames of the first frame and the second frame, and the connecting cable is configured to move horizontally in a left-right direction while seated in the seating grooves.

7. The active air flap device of claim 5, wherein a through hole through which the rotary shaft of the first flap passes is disposed in the first mounting groove, and the through hole includes a limiting hole which accommodates a stopper disposed on the rotary shaft and configured to limit a rotation range of the rotary shaft.

8. The active air flap device of claim 5, wherein a rotation direction of the first rack gear and a rotation direction of the second rack gear are the same.

9. The active air flap device of claim 1, wherein the first flap includes a first upper flap and a first lower flap which are disposed vertically, and in a state in which a first upper extension link extending from a rotary shaft of the first upper flap and a first lower extension link extending from a rotary shaft of the first lower flap are connected to a first end and a second end of a first connecting link, respectively, as the rotary shaft of the first lower flap is rotated by the driving force, the rotary shaft of the first upper flap connected to the first connecting link is rotated.

10. The active air flap device of claim 9, wherein the second flap includes a second upper flap and a second lower flap which are disposed vertically, and in a state in which a second upper extension link extending from a rotary shaft of the second upper flap and a second lower extension link extending from a rotary shaft of the second lower flap are connected to a first end and a second end of a second connecting link, as the rotary shaft of the second lower flap is rotated by the driving force transmitted through the link part, respectively, the rotary shaft of the second upper flap connected to the second connecting link is rotated.

* * * * *